United States Patent [19]

Shepard, Jr.

[11] Patent Number: 4,779,034
[45] Date of Patent: Oct. 18, 1988

[54] FORCED COMMUTATION FOR VARIABLE SPEED MOTOR

[76] Inventor: Francis H. Shepard, Jr., 19 Morris Ct., Summit, N.J. 07901

[21] Appl. No.: 894,111

[22] Filed: Aug. 7, 1986

[51] Int. Cl.$^4$ .............................................. H02P 5/40
[52] U.S. Cl. .................... 318/804; 318/798; 318/806; 318/809; 363/57; 363/138
[58] Field of Search ............... 363/138, 52–58; 318/803, 809, 798, 806, 804

[56] References Cited

U.S. PATENT DOCUMENTS

| | | | |
|---|---|---|---|
| 4,012,682 | 3/1977 | Carroll et al. | 363/138 |
| 4,509,004 | 4/1986 | Shepard, Jr. | 318/812 |
| 4,567,420 | 1/1986 | Beck | 363/138 |

OTHER PUBLICATIONS

Cho et al., "Novel Six-Step and Twelve-Step Current-Source Inverters with DC Side commutation and Energy Rebound", IEEE Transactions on Industry Applications, vol. 1A, No. 5, Sep./Oct. 1981, pp. 524–532.

Phillips, K. P., "Current Source Converter for AC Motor Drives", IEEE Transactions on Industry Applications, IA8, No. 6, Nov./Dec. 1972, pp. 679, 682.

*Primary Examiner*—David Smith, Jr.
*Attorney, Agent, or Firm*—Thomas R. Morrison

[57] ABSTRACT

A variable speed motor control system includes a power control circuit and a forced commutation control circuit for controlling the torque and rotational speed respectively of an induction motor. The power control circuit and the forced commutation control circuit are independently controlled by signals from a speed control circuit. An overcurrent sensor monitors the motor current and, if excessive current is detected, a speed and power monitor limits the response of the power control circuit and forced commutation control circuit to the speed command. The forced commutation control circuit and power drive circuit contain silicon-controlled rectifiers both for controlling the amount of power fed to the induction motor as well as for controlling the switching of power between combinations of motor windings. A re-pulse generator produces a high-frequency pulse signal with which the gate signals for the silicon-controlled rectifiers are gated to ensure that, if a silicon-controlled rectifier fails to fire when the gate signal is first applied, it will be triggered into conduction with minimum delay. In a current-source inverter embodiment of the invention, a self-regenerating switch momentarily shorts the DC power line feeding silicon-controlled rectifiers controlling the application of power to the motor windings. In preferred embodiments of the invention, two windings of a high-frequency inductor are connected in series with the DC power to the motor-control silicon-controlled rectifiers. The two windings of the high-frequency inductor are tapped for connection to the switch.

10 Claims, 16 Drawing Sheets

Fig. 3

FORCED COMMUTATION FOR VARIABLE SPEED MOTOR

BACKGROUND OF THE INVENTION

The present invention relates to motor control systems and, more particularly, to variable-speed motor control systems.

In my prior allowed U.S. patent application, Ser. No. 395,331, now U.S. Pat. No. 4,509,004, the disclosure of which is herein incorporated by reference, I disclose a motor control system for a variable speed motor employing a cycloconverter technique for gating fixed-frequency, 3-phase AC power to the windings of a variable speed induction motor in a sequence which produces a magnetic field in the motor rotating at a desired speed. A measurement of the shaft speed is added to a predetermined value of slip frequency to produce a driving signal. Power is gated to three motor windings through an array of 18 silicon-controlled rectifiers (SCRs), three on each winding for gating the plus portions of the three phases, and three on each winding for gating the minus portions of the three phases. The motor speed and torque are independently controlled. That is, the motor speed is controlled by combined speed and slip signals, whereas the torque is controlled by motor current. The control system varies the portion of each phase fed to the motor windings for controlling the motor current.

When SCRs are connected across AC lines, it is possible to accidentally trigger back-to-back SCRs to form a direct short between phases. As is well known, an SCR remains non-conducting until triggered into conduction by an appropriate signal at its gate electrode. Once in the conducting condition, it remains in the conducting condition until a voltage reversal at its anode and cathode terminals extinguishes such conduction for long enough to permit free carriers to be dissipated. Once conduction ceases, the SCR remains non-conducting until the trigger signal is again applied to its gate electrode. Even a very small residual current in an SCR is sufficient to permit full conduction to resume.

I employ a number of techniques in the referenced U.S. patent application to ensure that a previously conducting SCR is fully extinguished before permitting another SCR to begin conduction. For example, the plus voltages to all three of the motor windings flow through three windings of a first quad-winding transformer. Similarly, the minus voltages to all three of the motor windings flow through three windings of a second quad-winding transformer. When motor current flows through one of the windings in each of the quad-winding transformers, a powerful reverse voltage is induced in the other three windings to ensure that any residual current in the SCRs associated therewith is fully extinguished. In addition, at the time of transition from one motor winding to another, an appropriate extinguish pulse is applied to the fourth winding of the appropriate quad-winding transformer to provide further current extinguishment. A logic circuit generates the extinguish pulses for the plus and minus quad-winding transformers. The logic circuit further establishes the required relationships between the plus and minus extinguish pulses during forward and reverse motor rotation.

Another disclosed method for guaranteeing SCR extinguishment includes a sensitive motor current sensor whose output inhibits gating on a new SCR until the motor current provided by the previously conducting SCR is extinguished.

A further type of device for variable-speed motor drive from a fixed-frequency AC source employs a current source inverter (CSI) in which the AC source power is first rectified to produce DC power and the DC power is gated to the motor windings in a sequence effective for producing the rotating magnetic field.

Conventional CSI systems suffer from drawbacks which limit their usefulness. In particular, one type of CSI system is practical only with special motors having a low Q. That is, they are only useful with low-efficiency motors having a low ratio of winding inductance to winding resistance. In addition to the limitation imposed by the low-efficiency motor, such a conventional CSI system employs a complicated clamp circuit to avoid a chain of voltage increases in smoothing capacitors across the motor windings. The clamp circuit itself is an additional source of inefficiency.

OBJECTS AND SUMMARY OF THE INVENTION

Accordingly, it is an object of the invention to provide a variable speed motor control system which overcomes the drawbacks of the prior art.

It is a further object of the invention to provide a variable speed motor control system having simplified circuitry.

It is a still further object of the invention to provide a variable speed motor control system which simultaneously reverse biases all silicon-controlled rectifiers during transition from one motor winding drive configuration to another.

It is a still further object of the invention to provide a current source inverter control system for a variable speed motor in which a high-speed shorting switch momentarily short circuits the DC power line preparatory to switching from one configuration to another. The shorting extinguishes all SCR current to avoid accidental line-to-line current flow through the SCRs.

It is a still further object of the invention to provide a cycloconverter type motor control system in which all motor current passes through center-tapped windings of a quad-wound transformer. At the end of each period of energization, an extinguish pulse through the fourth winding in the quad-wound transformer back-biases each of the silicon-controlled rectifiers in the system a sufficient amount to guarantee current extinguishment in all silicon-controlled rectifiers.

It is a still further object of the invention to provide a variable speed motor control system in which motor speed and motor torque are separately controlled by a single input signal.

It is still further object of the invention to provide a variable speed motor control system in which excessive motor current reduces both motor speed and motor torque until a new operating condition is achieved at which motor current is within acceptable limits.

Briefly stated, the present invention provides a variable speed motor control system having a power control circuit and a forced commutation control circuit for controlling the torque and rotational speed, respectively, of an induction motor. A power drive circuit, responsive to signals from the power control circuit and forced commutation control circuit, produces signals for driving the induction motor. The power control circuit and forced commutation control circuit are independently controlled by signals from a speed control circuit which may optionally be responsive to a manual input. An overcurrent sensor monitors the motor current and, if excessive current is detected, a speed and power monitor limits the response of the power control circuit and forced commutation control circuit to the speed command whereby the induction motor is maintained within its efficient operating envelope. The forced commutation control circuit and power drive circuit contain silicon-controlled rectifiers both for controlling the amount of power fed to the induction motor, as well as for controlling the switching of power between combinations of motor windings. A re-pulse generator produces a high-frequency pulse signal by which the gate signals for the silicon-controlled rectifiers are gated. As a result, the gate signal is repetitively pulsed at a high frequency to ensure that, if a silicon-controlled rectifier fails to fire when its gate signal is first applied, it will be triggered into conduction with minimum delay. In a current-source inverter embodiment of the invention, a self-regenerating switch momentarily shorts the DC power line feeding silicon-controlled rectifiers controlling the application of DC power to the motor windings. In preferred embodiments of the invention, two windings of a high-frequency inductor on a common core are connected in series with the DC power to the motor-control silicon-controlled rectifiers. In the most preferred embodiment, the two windings of the high-frequency inductor are tapped for connection to the switch. This applies a reverse voltage to the motor-control silicon-controlled rectifiers whereby current therethrough is positively extinguished.

According to an embodiment of the invention, there is provided a variable speed motor control system for controlling a speed and a torque of an induction motor comprising a power control circuit, a forced commutation control circuit, a speed control circuit including means for producing a speed signal, a power drive circuit, the power control circuit including means responsive to the speed signal for applying a power control signal to the power drive circuit, the forced commutation control circuit including means independently responsive to the speed signal for applying a commutation command signal to the power drive circuit, the power drive circuit including means responsive to the power control signal for controlling an amount of power fed to the induction motor, the power drive circuit further including means responsive to the commutation command signal for controlling a speed of a commutation sequence of power application to windings of the induction motor and means responsive to a current in the induction motor exceeding a predetermined maximum value for limiting the power control signal and the commutation command signal fed to the power drive circuit whereby the induction motor remains within an efficient operating condition.

According to a feature of the invention, there is provided apparatus for controlling the feeding of power from a cycloconverter synthesizer to first, second and third motor windings of an induction motor, the cycloconverter synthesizer being of a type which employs a plurality of silicon-controlled rectifiers to gate variable portions of a positive and a negative phase of 3-phase AC power to two of the first, second and third motor windings in a sequence which produces a rotating magnetic field in the induction motor, comprising a transformer having at least first, second and third transformer windings on a common core, first, second and third center taps on the first, second and third transformer windings, the first, second and third motor windings being connected respectively to the first, second and third taps and first ends of the first, second and third transformer windings being connected to receive the power for the first, second and third motor windings respectively.

According to a further feature of the invention, there is provided a current-source inverter for variable speed control of an induction motor comprising an AC to DC power portion for rectifying a portion of phases of an AC power to produce a substantially DC power, the portion being dependent upon a power control signal, a DC power to variable-frequency AC portion responsive to commutation command signal for gating the substantially DC power to first, second and third motor windings of the induction motor in a sequence effective to drive the motor at a speed related to the speed signal, an inductor between the AC to DC power portion and the DC power to variable-frequency AC portion, means for short-circuiting the substantially DC power downstream of at least a portion of the inductor each time power to one of the first, second and third windings is to be terminated and power to another of the first, second and third windings is to be begun and the means for short-circuiting including a self-regenerating switch having a transformer with a saturable core, a primary winding of the transformer normally being effective for maintaining the core in reverse saturation, a first secondary winding of the transformer being disposed between a base and the emitter terminal of a transistor, a third winding of the transformer being disposed in series with a collector-emitter path of the transistor, the collector-emitter path being connected in series between opposite polarities of the substantially DC power, and a relationship between a number of turns on the primary and the first and second secondary windings being effective to maintain the transistor saturated for a predetermined period in response to an extinguish control signal applied to the primary winding.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a schematic diagram of a speed control circuit of FIG. 1.

DETAILED DESCRIPTION OF THE PREFERRED EMBODIMENT

Figure 1:
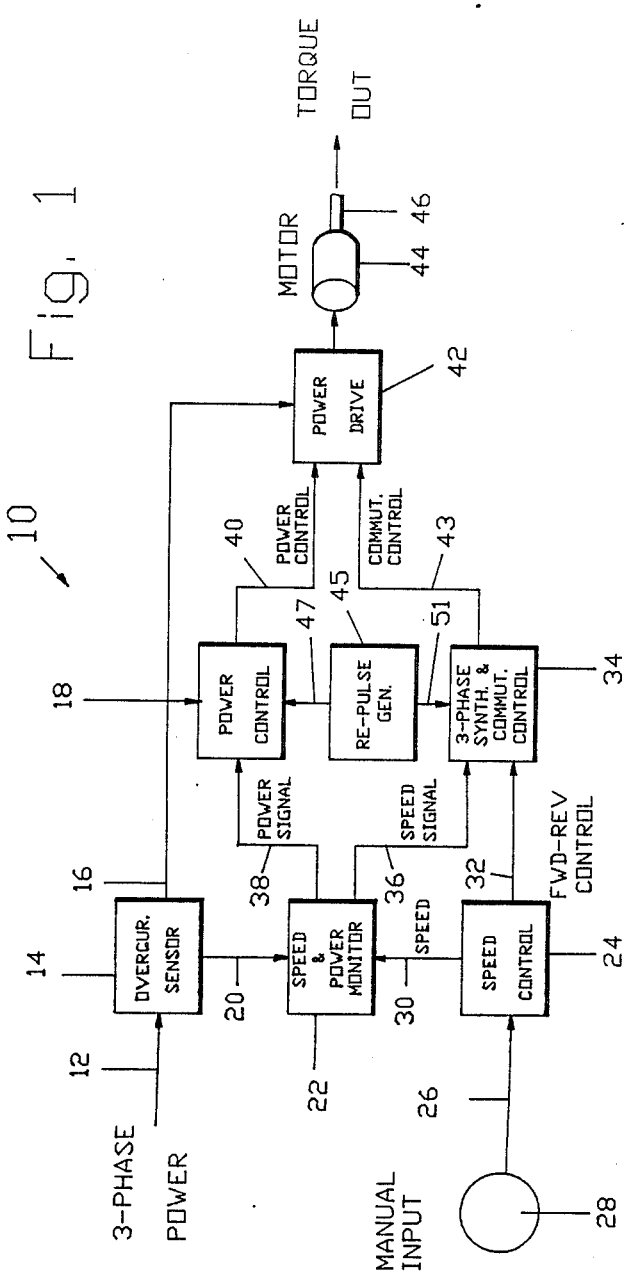
FIG. 1 is a simplified block diagram of a variable speed motor control system according to an embodiment of the invention.

Referring now to FIG. 1 there is shown, generally at 10, a variable speed motor control system according to an embodiment of the invention. Three-phase power is applied on a line 12 to an overcurrent sensor 14. The 3-phase power passes through overcurrent sensor 14 for application on a line 16 to a power control circuit 18. Overcurrent sensor 14 monitors the amplitude of the motor current passing therethrough and, whenever the motor current exceeds a predetermined threshold, overcurrent sensor 14 applies an overcurrent signal on a line 20 to a speed and power monitor 22 whose function is more fully detailed hereinbelow.

A speed control circuit 24 receives a command input on a line 26 from any convenient source such as, for example, a manual input 28. In response to manual input 28, speed control circuit 24 produces a speed signal which is applied on a line 30 to speed and power monitor 22. Speed control circuit 24 applies the same value of speed signal to speed and power monitor 22 for equal values of positive and negative (forward and reverse) speed. Speed control circuit 24 applies a forward-reverse control signal on a line 32 to a three-phase synthesizer and commutation control circuit 34.

A speed signal, derived from the speed signal on line 30, is applied by speed and power monitor 22 on a line 36 to three-phase synthesizer and commutation control circuit 34. In addition, a power control signal, also derived from the speed signal in speed and power monitor 22, is applied on a line 38 to power control circuit 18. Power control circuit 18 applies a set of power-control signals on a line 40 to a power drive circuit 42. Three-phase synthesizer and commutation control circuit 34 applies a set of commutation control signals on a line 43 to power drive circuit 42.

A re-pulse generator 45 produces a re-pulse signal, having a high frequency relative to the commutation frequency. The re-pulse signal is applied on a line 51 to three-phase synthesizer and commutation control circuit 34 and on a line 18 to power control circuit 18. As will be more fully described hereinafter, the high-frequency re-pulse signal is effective for ensuring that all silicon-controlled rectifiers in power drive circuit 42 which are required to be gated on at any time are indeed gated on even if one or more of the SCRs fails to fire when first triggered.

In response to the signals on lines 40 and 43, power drive circuit 42 applies power to an induction motor 44 in a sequence and amplitude effective for producing a rotating magnetic field in induction motor 44 which generates an output torque on a motor shaft 46 proportional to the amplitude of the speed command produced by manual input 28.

In the absence of an overcurrent signal on line 20, the speed and power control signals on lines 36 and 38 are generally responsive to the speed signal on line 30. Power control circuit 18 responds to the power signal applied thereto by applying power control signals to power drive circuit 42 for selecting a greater or lesser portion of the cycles of AC power for powering induction motor 44. Such a technique, commonly called phase control, varies the average power fed to induction motor 44. The commutation control signals fed on line 43 to power drive circuit 42 control the rate at which the power is switched between combinations of windings in induction motor 44, and thus the rotational speed of motor shaft 46.

If a large value of speed signal is generated when an excessive load is applied to motor shaft 46, induction motor 44 may be unable to produce sufficient torque to respond to the speed signal. Variable speed motor control system 10 runs open loop; that is, without speed feedback. When induction motor 44 is unable to produce sufficient torque in response to the speed signal, the slip frequency increases in induction motor 44. The increased slip frequency at high torque produces an increase in motor current sensed by overcurrent sensor 14 which exceeds a threshold value of current in speed and power monitor 22. Speed and power monitor 22 simultaneously reduces the power control signal fed on line 38 to power control circuit 18 and reduces the speed signal fed on line 36 to three-phase synthesizer and commutation control circuit 34. The resulting simultaneous reduction in both speed and power fed to induction motor 44 reduces the commanded speed and torque of induction motor 44 to values which permit induction motor 44 to operate at a slip frequency providing high motor efficiency.

As noted in the description of the background of the invention, two basic types of variable speed AC drive systems are found in the prior art, i.e. cycloconverter systems and current-source inverter systems. The block diagram in FIG. 1 may embody either type of drive system. Except for the content of power drive circuit 42, all circuits in variable speed motor control system 10 to achieve the two types of drive systems are identical. As a consequence, description of power drive circuit 42 is held in abeyance until each of the other elements of variable speed motor control system 10 is described in detail. At that time, sufficient basis having been established, the several species of power drive circuit 42 are described.

Figure 2:
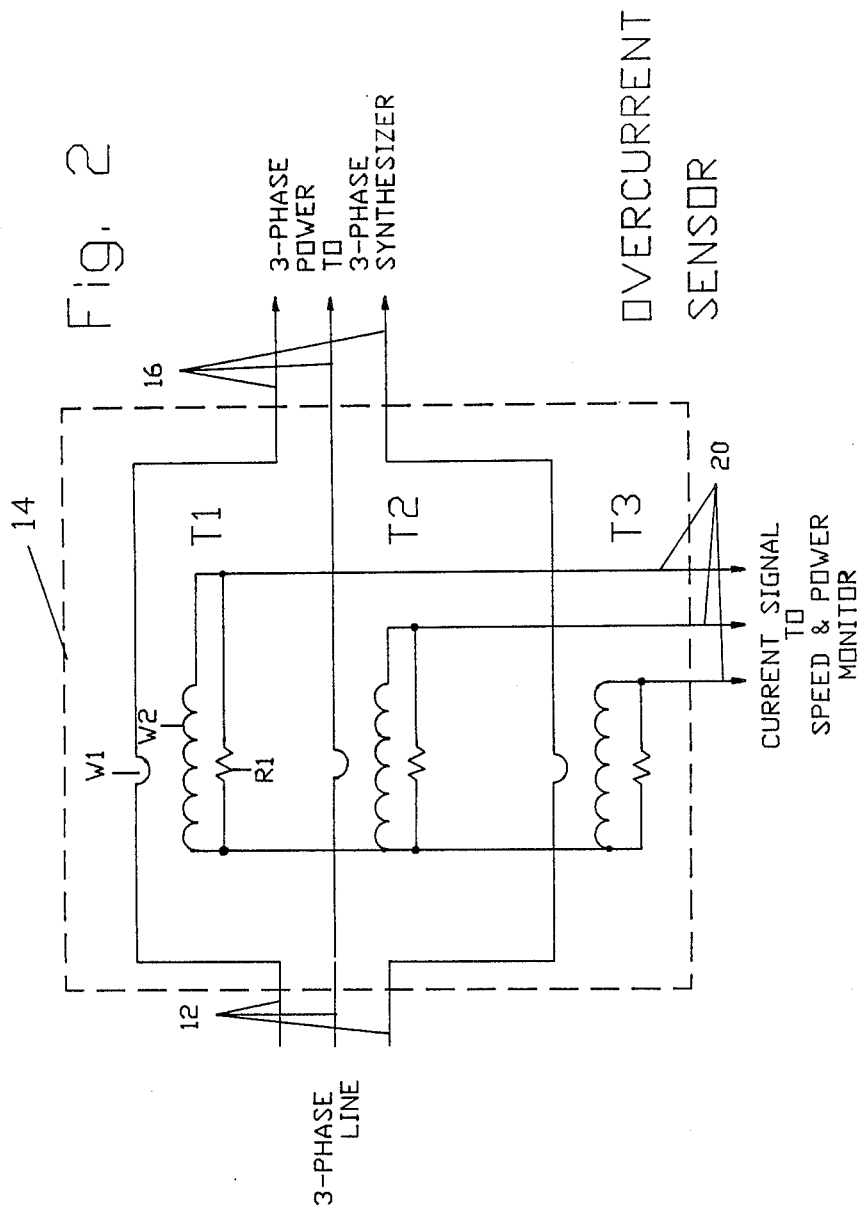
FIG. 2 is a schematic diagram of an overcurrent sensor suitable for use in the control system of FIG. 1.

Referring now to FIG. 2, overcurrent sensor 14 contains three identical current transformers, T1, T2 and T3, each having a primary winding W1 in series with one of the three phases between line 12 and line 16 (only the elements associated with current transformer T1 are identified by reference designators). Each current transformer T1, T2 and T3 further includes a secondary winding W2 having a resistor R1 in parallel therewith. Each current transformer T1, T2 and T3 applies an output signal to a respective conductor in line 20 proportional to the motor current passing therethrough.

Figure 3:
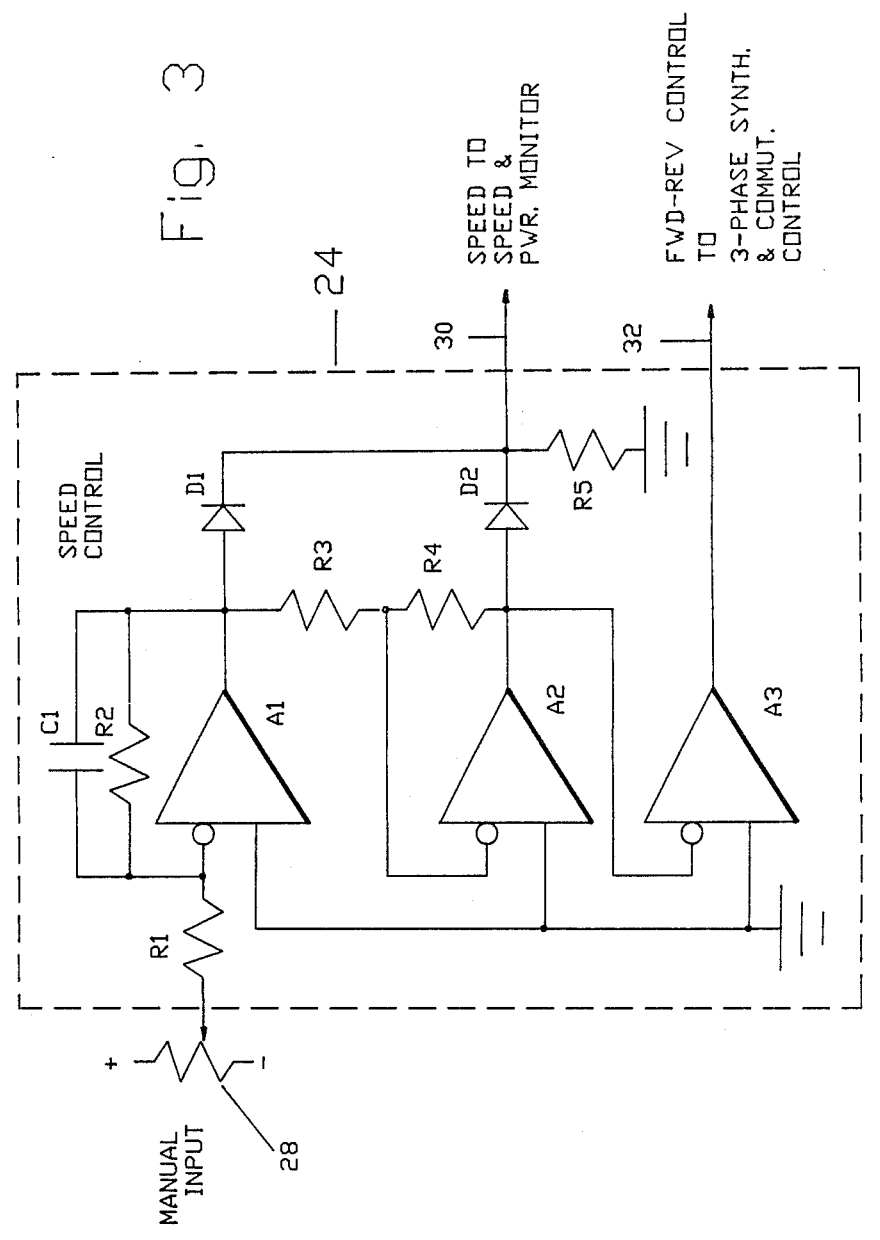

Referring now to FIG. 3, manual input 28 is a variable resistor having positive and negative voltages applied to its opposed terminals. A positive or negative voltage, proportional to a setting of manual input 28, is applied through a resistor R1 to an inverting input of an operational amplifier A1. The direct input of operational amplifier A1 is grounded. A feedback resistor R2 between the output and the inverting input of operational amplifier A1 controls the gain of operational amplifier A1. A capacitor C1, in parallel with resistor R2, limits the speed at which the output of operational amplifier A1 can change in response to changes in speed command from manual input 28. Thus, even in the presence of a sharp, high-amplitude, change in speed command from manual input 28, the output of operational amplifier A1 is constrained to change at a rate which can be followed by induction motor 44 (FIG. 1) under normal load conditions.

Operational amplifier A1 produces positive and negative output speed signals in response to negative and positive speed commands respectively. The output of operational amplifier A1 is applied through an input resistor R3 to an inverting input of an operational amplifier A2. The direct input of operational amplifier A2 is grounded. A feedback resistor R4 controls the gain of operational amplifier A2. In the preferred embodiment, the gain of operational amplifier A2 is set to unity by selecting equal resistance values for resistors R3 and R4. Thus, operational amplifier A2 functions as an inverter, providing an output signal equal in amplitude, but opposite in polarity, to the output of operational amplifier A1. Diodes D1 and D2 have their respective anode terminals connected to the outputs of operational amplifiers A1 and A2. The cathode terminals of diodes D1 and D2 are connected together and to one terminal of a resistor R5, the other terminal of which is grounded. The cathode junctions of diodes D1 and D2 provide the speed signal applied to line 30. Diodes D1 and D2 are poled to apply only positive signals to line 30. That is, when the output of operational amplifier A1 is positive, its output is applied through diode D1 to line 30. At that time, the output of operational amplifier A2, being negative, is blocked from line 30 by diode D2. When the output of operational amplifier A1 goes negative, its output is blocked from line 30 by diode D1. At this time, however, the output of operational amplifier A2, being positive (having a polarity opposite to that of the output of operational amplifier A1), is applied through diode D2 to line 30.

The output of operational amplifier A2 is applied to an inverting input of a threshold circuit A3 whose direct input is grounded. The output of threshold circuit A3 is the forward-reverse signal applied to line 32. Whenever the signal applied to the inverting input of threshold circuit A3 is positive, its output goes to its full negative value. When the signal applied to the inverting input of threshold circuit is negative, its output goes to its full positive value. The polarity of the output of threshold circuit A3 thus represents the commanded direction of rotation for induction motor 44.

Figure 4:
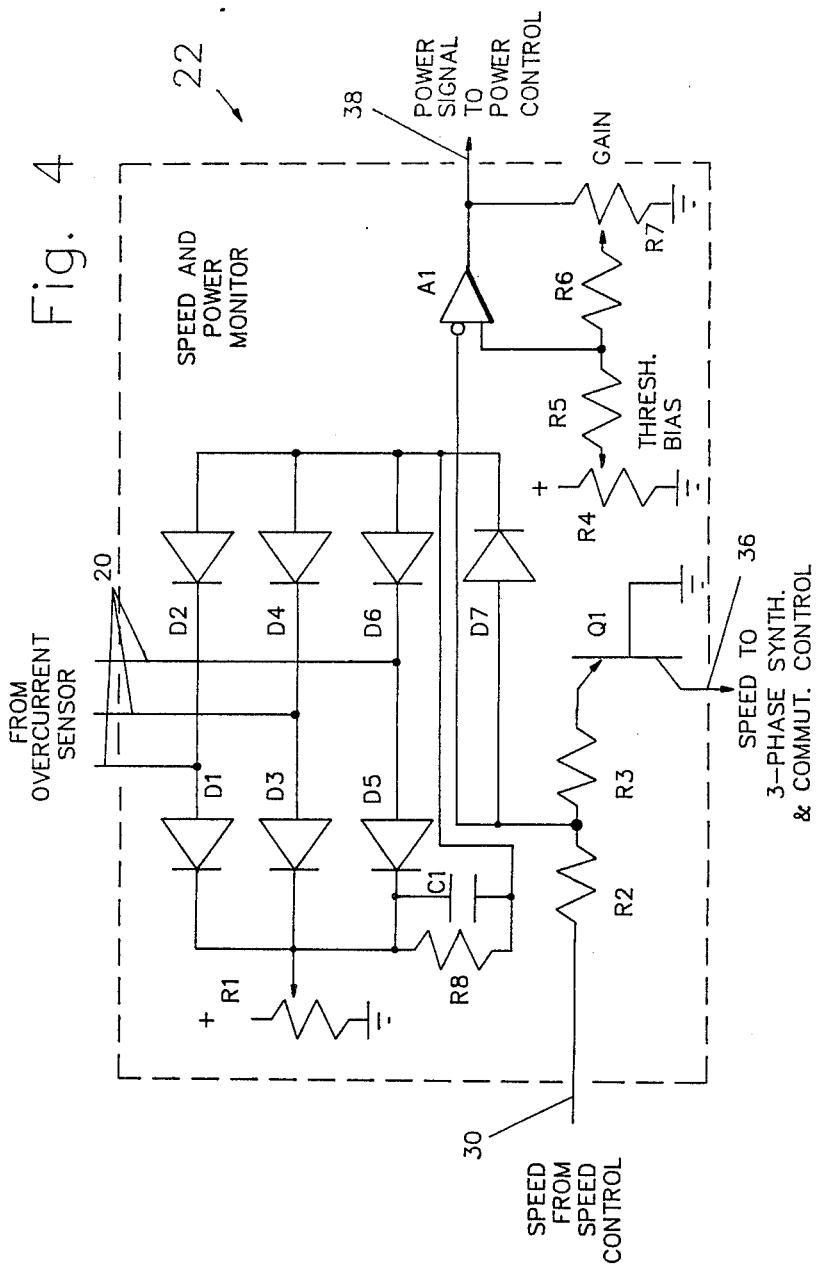
FIG. 4 is a schematic diagram of a speed and power monitor of FIG. 1.

Referring now to FIG. 4, speed and power monitor 22 contains a full-wave, three-phase rectifier consisting of three pairs of diodes D1 and D2, D3 and D4, and D5 and D6. Each pair of diodes has one of the conductors of line 20 connected to its anode-cathode junction. The cathode terminals of diodes D1, D3 and D5 are connected together and to the wiper of a variable resistor R1. The resistive element of resistor R1 is connected between a positive voltage and ground. The anode terminals of diodes D2, D4 and D6 are connected together and to the cathode terminal of a diode D7. The speed signal on line 30 is applied through resistors R2 and R3 to the emitter of a transistor Q1. The base of transistor Q1 is grounded and its collector is connected to line 36. The anode terminal of diode D7 is connected to the junction of resistors R2 and R3. A resistor R8, in parallel with a capacitor C1, is connected from the junction of the cathode terminals of diodes D1, D3 and D5 to the junction of the anode terminals of diodes D2, D4 and D6.

The junction of resistors R2 and R3 is connected to the inverting input of an operational amplifier A1. The direct input of operational amplifier A1 is connected to the junction of resistors R5 and R6. The second terminal of resistor R5 is connected to the wiper of a variable resistor R4. The resistive element of variable resistor R4 is connected between a positive voltage and ground. The second terminal of resistor R6 is connected to the wiper of a variable resistor R7 whose resistive element is connected between the output of operational amplifier A1 and ground. The output of operational amplifier provides the power control signal applied to line 38.

Under normal operation, diode D7 is back biased by a positive bias voltage fed to its cathode terminal through resistor R8. The voltage at the junction of resistors R2 and R3 is normally controlled entirely by the speed signal on line 30. As a consequence, the power control signal generated by operational amplifier A1 is also normally controlled by the speed signal. Similarly, the current passing through transistor Q1, fed as the speed signal to line 36, is also normally controlled by the speed signal on line 30.

When induction motor 44 (FIG. 1) begins to draw a current sufficiently large to produce a negative voltage at the anode terminals of diodes D2, D4 and D6 to exceed the positive bias voltage fed to that point through resistor R8, diode D7 becomes forward biased. The forward resistance of diode D7 is much smaller than the resistance of resistor R2. Thus, the voltage at the junction of resistors R2 and R3 is totally controlled by the voltage fed to it through diode D7 and is insensitive to changes in the speed signal on line 30. As a consequence, as soon as motor current exceeds the threshold set by variable resistor R1, control of motor speed and torque is strictly limited by speed and power monitor 22 and is no longer under control of manual input 28 and speed control circuit 24 (FIG. 1) until the motor current is reduced below the threshold established by variable resistor R1. That is, motor torque is limited by the value of the power control signal on line 38 and motor speed is limited by the speed signal on line 36 whenever the motor current threshold is exceeded.

The combination of limited rate of change in commanded speed effected by speed control circuit 24, with a strict limit on motor speed and torque commands based on a measurement of motor current effected by speed and power monitor 22, permits open-loop operation of induction motor 44 without suffering the inefficiencies normally attendant upon a system which permits the slip frequency of an induction motor to vary without control by these quantities.

Figure 5:
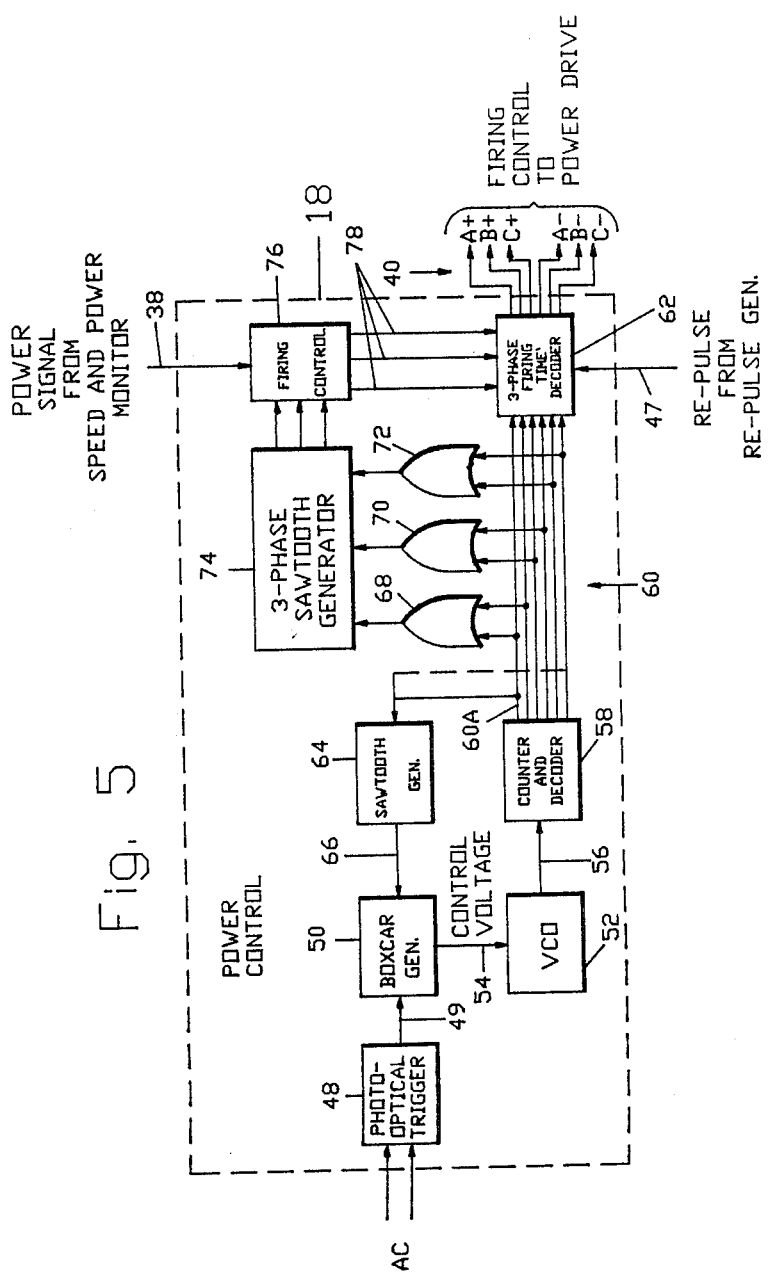
FIG. 5 is a block diagram of a power control circuit of FIG. 1.

Referring now to FIG. 5, power control circuit 18 includes a photo-optical trigger 48 receiving AC power from any two of phases A, B and C, or from any one phase and a ground connection. Photo-optical trigger 48 produces a sharp pulse each time its input AC power passes through a predetermined condition such as, for example, through zero. The sharp pulses are applied on a line 49 to a boxcar generator 50 whose function is more fully detailed hereinafter. A voltage-controlled oscillator 52 receives a control voltage on a line 54 from boxcar generator 50. Voltage-controlled oscillator 52 generates a square-wave output signal at a frequency which is nominally an integral multiple of six times the frequency of the AC power fed to photo-optical trigger 48. The square-wave output of voltage-controlled oscillator 52 is applied on a line 56 to a counter and decoder 58.

Counter and decoder 58 produces a commutating sequence of output signals on its six output lines 60, each output signal enduring for about one-sixth of a cycle of the commutating sequence. The output signals on output lines 60 are applied to a 3-phase firing time decoder 62 which produces a sequence of fire control signals on line 40 for firing power control silicon-controlled rectifiers (not shown) in a subsequent circuit. The output on one of output lines 60 such as, for example, output line 60A, is fed to an input of a sawtooth generator 64. Sawtooth generator 64 generates a sawtooth signal having a sawtooth portion which is only slightly shorter than the period of the AC power fed to photo-optical trigger 48. A nominal period for the sawtooth portion of about 14 milliseconds provides a period equal to about five-sixths of the period of 60-Hertz AC power. If other line frequencies are employed, the sawtooth period is appropriately changed. This sawtooth signal is fed on a line 66 to boxcar generator 50.

The output signals on output lines 60 from counter and decoder 58 are fed in pairs to OR gates 68, 70 and 72 which feed their combined outputs to a 3-phase sawtooth generator 74 containing three substantially identical sawtooth generators each producing a sawtooth signal having a period that is approximately two-thirds the period of the AC input to photo-optical trigger 48. The three sawtooth signals are applied on separated lines to a firing control circuit 76. Firing control circuit 76 also receives the power signal on line 38 from speed and power monitor 22 (FIGS. 1 and 4). As each sawtooth signal from 3-phase sawtooth generator 74 passes through a value established by the power signal, firing control circuit 76 applies an appropriate fire signal on one of lines 78 to 3-phase firing time decoder 62. Three-phase firing time decoder 62 determines which of its six lines 40 should be in the enabled, or energized, condition based on the output signals on output lines 60 and the firing time within the cycle of each of the input AC power phases based on the fire signals on lines 78. Three-phase firing timer decoder 62 produces fire control signals for controlling the gating of plus and minus values of phases A, B and C which are applied to the six lines 40 for connection to power drive circuit 42 (FIG. 1). A fuller description of the exact manner in which the fire signals are generated is contained in my referenced prior patent application, the disclosure of which is herein incorporated by reference. In addition, it is considered that one skilled in the art, having the present disclosure before him, would be fully enabled to make and use the invention. Further disclosure of the circuits for generating the six fire signals is considered to be redundant and is therefore omitted herefrom.

Figure 6:
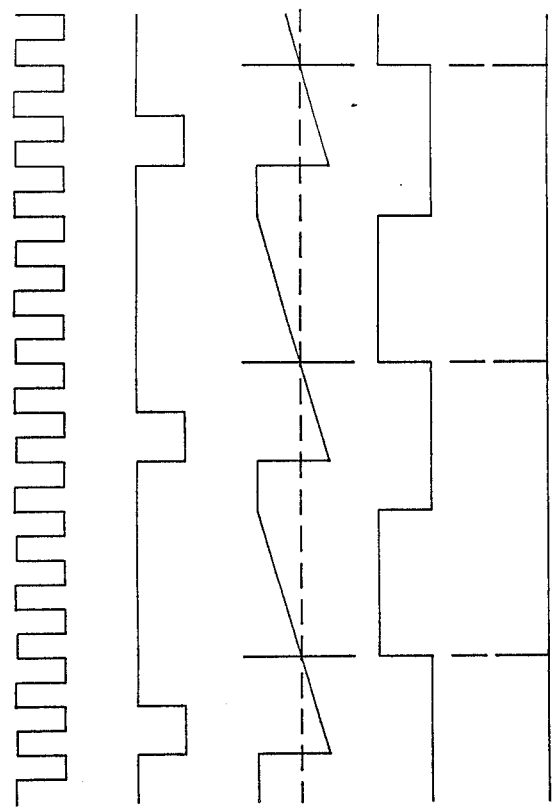
FIGS. 6A–6E are curves to which reference will be made in explaining the operation of a portion of the power control circuit of FIG. 5.

Returning now to a description of the remainder of power control circuit 18, photo-optical trigger 48, together with boxcar generator 50, voltage-controlled oscillator 52, counter and decoder 58 and sawtooth generator 64 form an automatic frequency control circuit which is effective to bring the frequency of voltage-controlled oscillator 52 into a predetermined relationship with the frequency of the AC input and further to control the phase of the output of voltage-controlled oscillator 52 to a value which establishes a predetermined relationship between the phases of the output signals on output lines 60 and the phases of the AC power. Reference is also made to the waveforms in FIGS. 6A-6E. The square-wave output of voltage-controlled oscillator 52 is shown in FIG. 6A. The resulting decoded signal at output line 60A is shown in FIG. 6B. At the beginning of each output signal on output line 60A, sawtooth generator 64 begins a sawtooth cycle (see FIG. 6C) which is applied to boxcar generator 50. A squared representation of the AC power is shown in FIG. 6D and the sharp pulses occurring at the positive-going edges of the signal of FIG. 6D are shown in FIG. 6E. The amplitude of the sawtooth signal existing at the time that photo-optical trigger 48 generates its sharp pulse, indicated by the horizontal dashed line in FIG. 6C, is sampled in boxcar generator 50 and stored for the remainder of the cycle until the receipt of the next sharp pulse from photo-optical trigger 48. The stored value, applied to voltage-controlled oscillator 52, controls the frequency of voltage-controlled oscillator 52. If the phase of the signal of voltage-controlled oscillator 52 drifts from its predetermined value, the pulses fed to sawtooth generator 64 tend to arrive earlier or later as necessary to give the sawtooth output of sawtooth generator 64 a longer or shorter time to increase before the occurrence of the sharp trigger from photo-optical trigger 48. Thus, the voltage stored by boxcar generator 50 is adjusted. The stored voltage, applied to voltage-controlled oscillator 52, is effective to return the phase of voltage-controlled oscillator 52 to its correct value with respect to the phase of the AC power.

Although the signal fed to sawtooth generator 64 is shown connected from output line 60A, it may be desirable to apply a signal from one of the others of output lines 60 for triggering sawtooth generator 64. This possibility is indicated by a dashed line parallel to the line feeding the input of sawtooth generator 64. That is, any one of output lines 60 may be selected as required to control the phase of voltage-controlled oscillator 52 within its control range.

The circuits of power control circuit 18 may employ any convenient parts. Voltage-controlled oscillator 52, for example, may be a 555 or half a 556 integrated circuit timer. Counter and decoder 58 may employ a 74161 counter suitably connected with conventional load and preset feedback to complete an output cycle in response to six input cycles with a 7442 decoder receiving the output lines from the counter. If convenient, voltage-controlled oscillator 52 may be operated at an integral multiple of six times the AC line frequency. A further counter may then be used in counter and decoder 58 to count down the higher-frequency signal from voltage-controlled oscillator 52 to the required value for application to counter and decoder 58.

Figure 7:
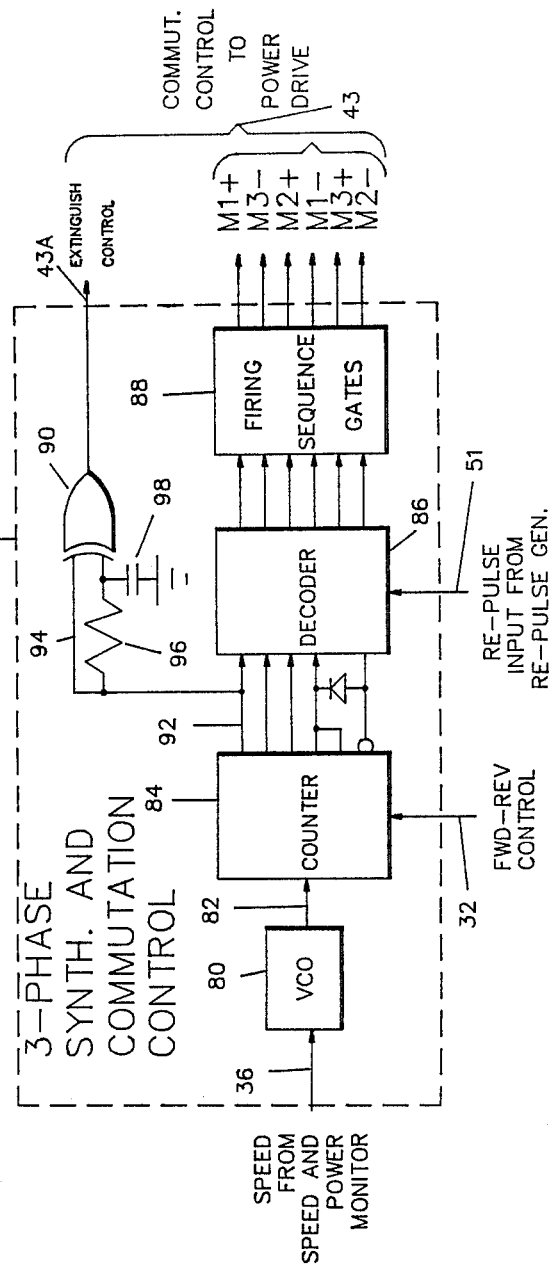
FIG. 7 is a block diagram of a three-phase synthesizer and commutation control circuit of FIG. 1.

Referring now to FIG. 7, three-phase synthesizer and commutation control circuit 34 contains a voltage-controlled oscillator 80 which is effective to produce an output signal having a frequency proportional to the amplitude of the positive speed signal fed to it on line 36. The signal from voltage-controlled oscillator 80 is applied on a line 82 to an input of an up-down counter 84. The forward-reverse control signal on line 32 is fed to a second input of up-down counter 84. The outputs of up-down counter 84 are connected to a decoder 86. Preloading and resetting interconnections shown between up-down counter 84 and decoder 86 are effective to cycle up-down counter 84 forward or reverse in a six-step cycle depending on the value of the forward-reverse control signal on line 32. Decoder 86 produces a sequence of six output signals on its output lines which are applied to a firing sequence gate circuit 88. Firing sequence gate circuit 88 contains logic gates to select pairs of motor windings for receiving plus and minus power either from the line in a cycloconverter embodiment or from a rectified supply in a current-source inverter embodiment. For a full discussion of such logic gating, reference may be made to my referenced prior patent application, the disclosure of which is herein incorporated by reference.

In my referenced patent application, I employ separately generated extinguish pulses for extinguishing SCRs carrying positive polarity and extinguish pulses for extinguishing SCRs carrying negative polarity power. As will be explained hereinafter, the present invention permits simplifying the generation of extinguish pulses to a single exclusive OR gate 90 and related components.

The least significant bit output from up-down counter 84 on a line 92 is connected by a line 94 directly to one input of exclusive OR gate 90. The same signal is delayed for about 10 microseconds in a resistor 96 and capacitor 98 before being fed to the second input of exclusive OR gate 90. Each time the signal on line 92 changes state, either positive-going or negative-going, for a period equal to the 10-microsecond delay time, the two inputs of exclusive OR gate 90 are different. Thus, the output of exclusive OR gate 90 contains 10-microsecond pulses whose beginnings coincide with positive and negative signal transitions on exclusive OR gate 90. The 10-microsecond pulses are used to positively extinguish conduction in all SCRs each time one SCR (or set of SCRs) is to become inactive and another SCR (or set of SCRs) is to become active.

Three-phase synthesizer and commutation control circuit 34 may employ any convenient type of parts to accomplish its functions. In the preferred embodiment, three-phase synthesizer and commutation control circuit 34 employs the same types of voltage-controlled oscillator, counter and decoder used in power control circuit 18, previously listed in connection with the description of FIG. 5.

In the cycloconverter embodiment of the present invention, positive portions of each phase are gated in sequence to one winding of induction motor 44 and negative portions of other phases are simultaneously gated to another winding of induction motor 44.

Figure 8:
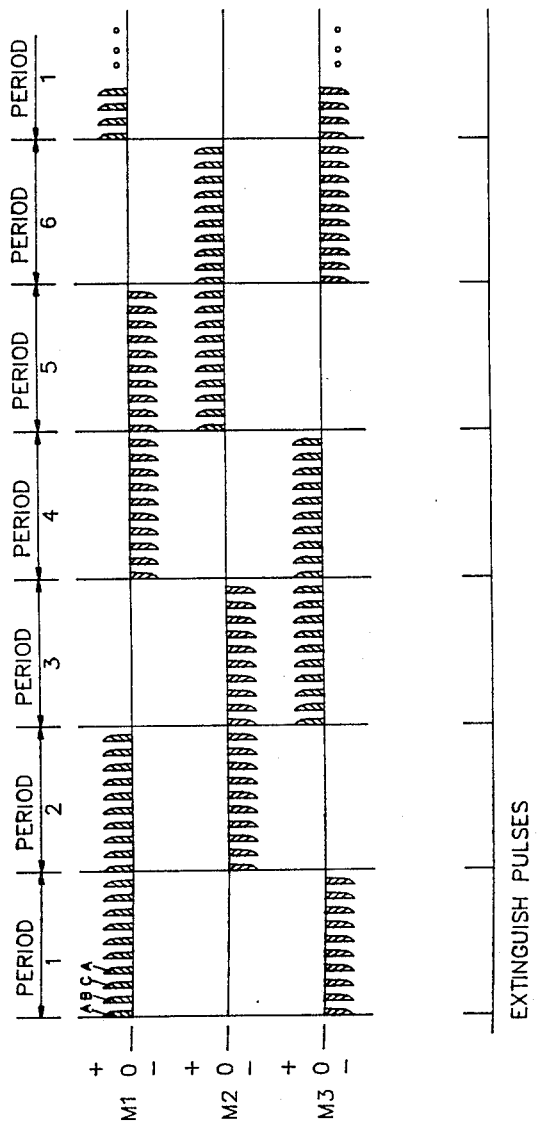
FIG. 8 is a set of curves to which reference will be made in decribing the operation of the control system of FIG. 1.

Referring now to FIG. 8, a driving cycle for a cycloconverter embodiment is divided into six periods. During period 1, positive partial waveforms of phases A, B and C are gated to winding M1 of induction motor 44, and negative partial waveforms are gated to winding M3. Winding M2 is inactive during period 1. At the transition between periods 1 and 2, winding M3 becomes inactive and winding M2 begins receiving negative partial waveforms. Winding M1 continues to receive positive partial waveforms during period 2. Similarly, at the transition from period 2 to period 3, winding M2 continues receiving negative power, winding M3 begins receiving positive power and winding M1 becomes inactive. The rate at which the apparatus cycles through the six periods of FIG. 8, and thus the speed of induction motor 44, is determined by the frequency generated in three-phase synthesizer and commutation control circuit 34 in response to the speed signal from manual input 28 (FIG. 3). The fraction of each phase of the AC power fed to induction motor 44, and thus the torque which induction motor 44 is capable of producing, is determined by power control circuit 18, which is also responsive to the speed signal from manual input 28. In this way, both speed and torque are separately commanded in response to a single control.

Figure 9:
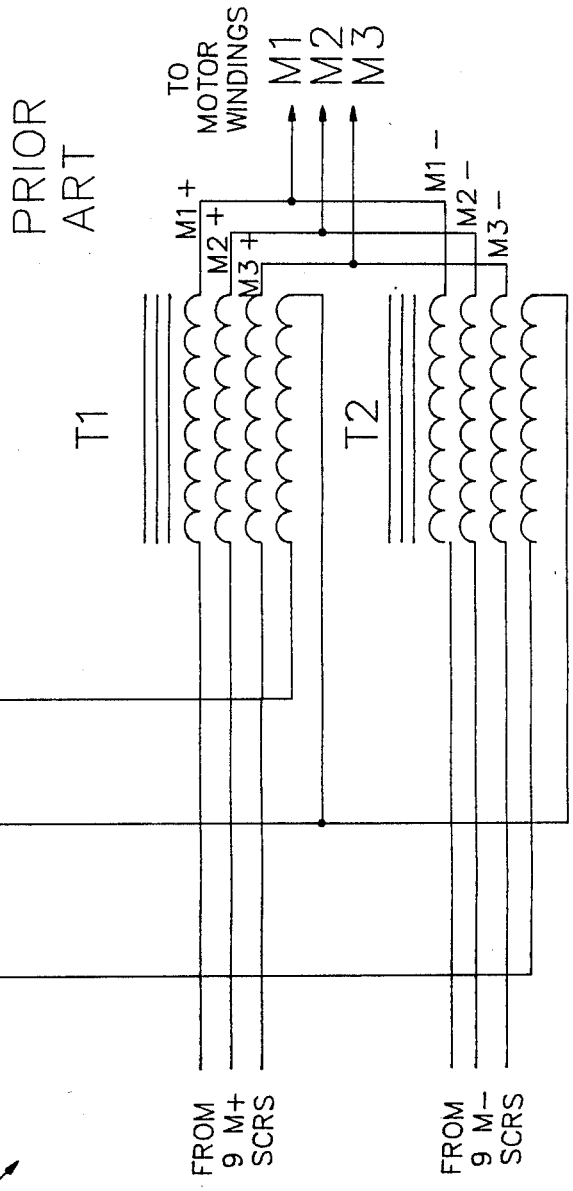
FIG. 9 is a portion of a cycloconverter control system according to my prior referenced patent application. This figure is labelled prior art solely because it was disclosed in my prior application and is not admitted prior art for any purpose.

Referring now also to a portion of my prior patent application illustrated in FIG. 9, in that disclosure a forced-commutation circuit 99 employs two quad-wound transformers T1 and T2 feeding the power waveforms of FIG. 8 to windings M1, M2 and M3 of induction motor 44. Transformer T1 always receives the positive pulsations such as those for winding M1 during periods 1 and 2, winding M2 during periods 5 and 6 and winding M3 during periods 3 and 4. Similarly, transformer T2 receives only negative pulsations such as those directed to winding M1 during periods 4 and 5, winding M2 during periods 2 and 3 and winding M3 during periods 1 and 6. Whenever any winding in transformers T1 and T2 carry motor power, powerful reverse voltages are induced in the other windings. These reverse voltages, fed back to the non-energized SCRs in the gating circuit described in my referenced patent application, tend to back-bias these non-energized SCRs, thereby ensuring that any residual current therein is extinguished.

The fourth winding in transformer T1 receives a powerful extinguish pulse from a plus switch 100 each time positive power fed to one winding must stop and positive power to another winding must begin. The extinguish pulse further ensures complete extinguishment of current through all 9 positive SCRs, especially including the previously conducting SCRs.

Similarly, the fourth winding in transformer T2 receives an extinguish pulse from a minus switch 102 to positively extinguish all current through the nine negative SCRs. The positive and negative extinguish pulses are of opposite polarity in order to extinguish their respective SCRs. The logic circuit required to generate separate positive and negative extinguish pulses is relatively complex compared to a simple exclusive OR gate 90 (FIG. 7), as is permitted by the present invention.

Figure 10:
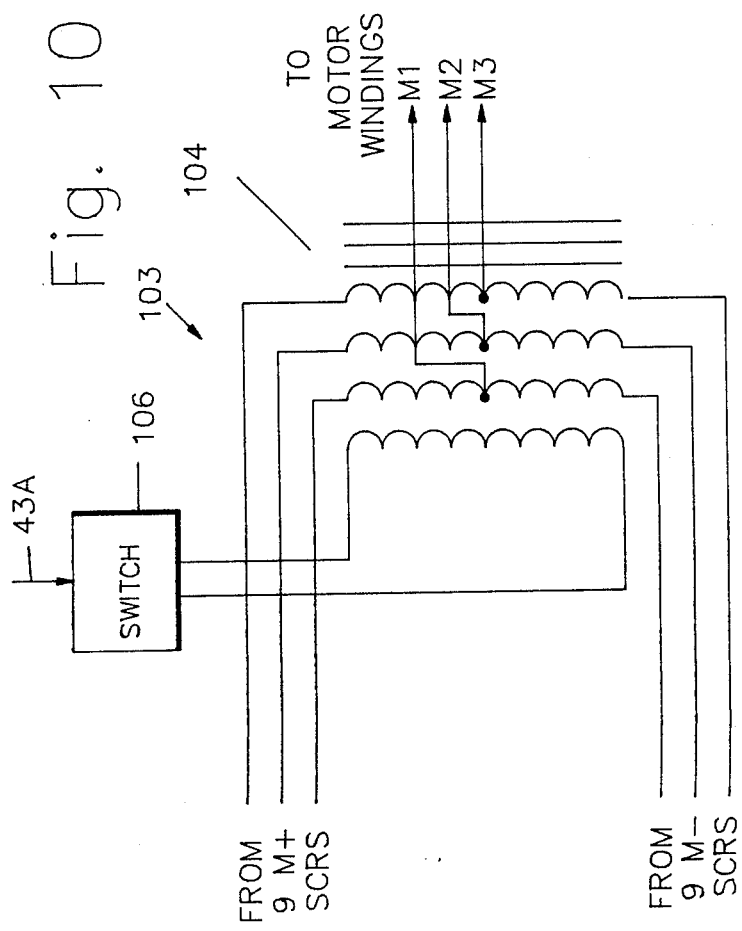
FIG. 10 is a portion of the cycloconverter control system according to an embodiment of the invention.

Referring now to FIG. 10, a forced commutation circuit 103 according to an embodiment of the invention includes a center-tapped, quad-wound transformer 104 receiving all plus inputs from its associated 9 SCRs at one set of three inputs, and all minus inputs from its other associated 9 SCRs at a second set of three inputs. Center taps on three of the windings of center-tapped quad-wound transformer 104 are connected to respective ones of motor windings M1, M2 and M3. A single switch 106 is connected to the fourth winding in center-tapped quad-wound transformer 104. Switch 106 is controlled by the extinguish control pulses occurring at each period transition (see FIG. 8). Since center-tapped quad-wound transformer 104 is center-tapped, an extinguish pulse applied to the fourth quad winding thereof is effective to drive both the plus and the minus SCRs into extinguishment without the need for the additional transformer, switch and logic hardware that were necessary in my prior referenced patent application.

In addition to permitting hardware simplification, I have found that forced commutation circuit 103 of FIG. 10 is much more effective in preventing cross-firing of SCRs from line to line. This effect is particularly apparent at high motor speeds. With the apparatus disclosed in my prior referenced patent, it is possible to drive induction motor 44 at a speed approaching the frequency of the AC line. With the simplified forced commutation circuit 103 of the present invention, induction motor 44 can be driven at a speed exceeding the frequency of the AC line and, in fact, at a speed at least approaching twice the frequency of the AC line.

Figure 11:
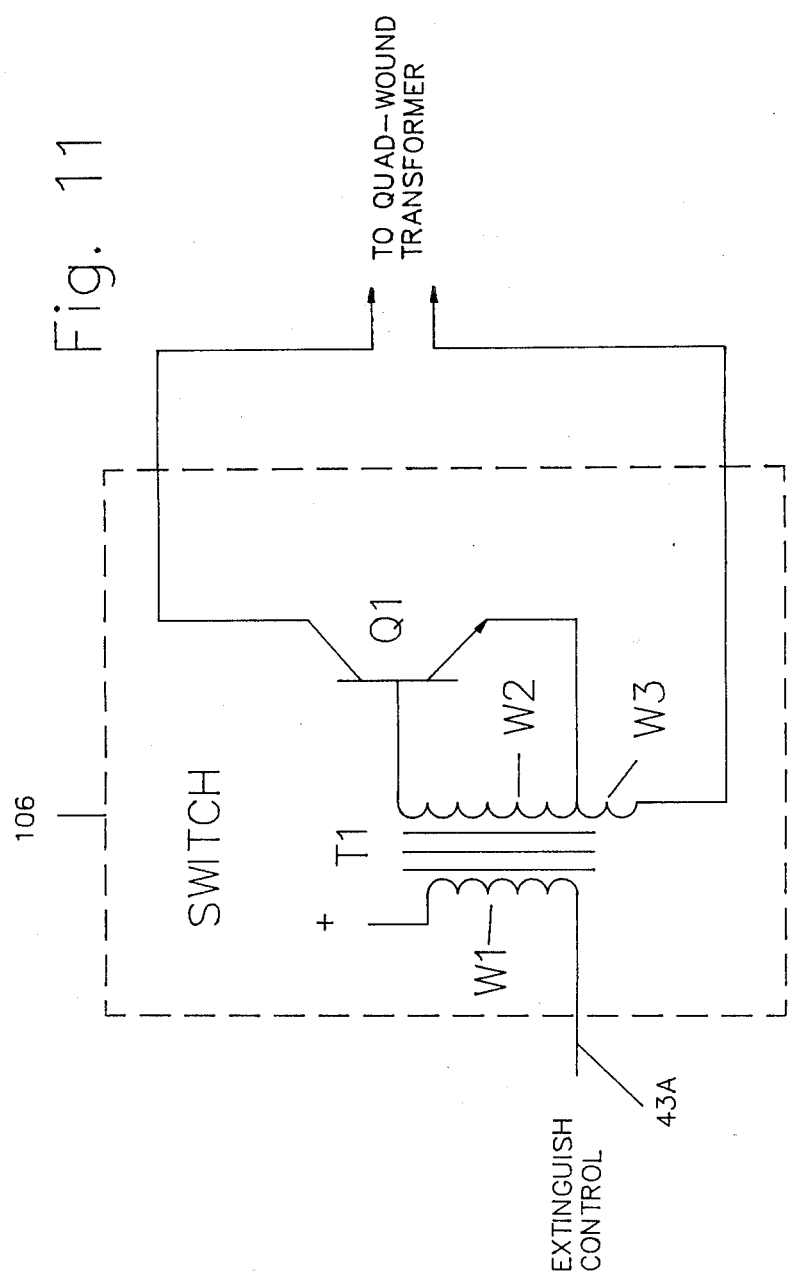
FIG. 11 is a schematic diagram of a switch for use in the cycloconverter control systems of FIGS. 9 and 10.

One embodiment of switch 106, which is particularly suitable for use in forced commutation circuit 103, is shown in FIG. 11. A transformer T1 includes a primary winding W1 and a tapped secondary forming secondary windings W2 and W3. In the quiescent condition, the extinguish-control signal, originating in three-phase synthesizer and commutation control circuit 34 (FIG. 7), applied on line 43A to primary winding W1, is at ground potential. The resulting current passing through primary winding W1 from the positive supply to ground maintains the core of transformer T1 in the reverse saturated condition. Due to the reverse saturated condition of the core of transformer T1, no current is induced in the secondary windings of transformer T1. Thus, transistor Q1 remains in the cut-off condition.

When a 10-microsecond, positive-going extinguish control pulse, generated in the manner described in connection with FIG. 7, is applied on line 43A to primary winding W1, a momentary interruption of current through primary winding W1 causes the magnetic field in transformer T1 to collapse. The collapse of the magnetic field induces a current and voltage in secondary winding W2 which is effective to drive transistor Q1 into saturation. The resulting current flow through transistor Q1 and the fourth winding in center-tapped quad-wound transformer 104 (FIG. 10), passing through secondary winding W3, is effective to induce a maintaining voltage in secondary winding W2 thereby maintaining transistor Q1 in saturation. The saturated condition of transistor Q1 continues as long as a buildup in the magnetic field of transformer T1 continues at a rate great enough to induce a sufficient voltage in secondary winding W2 to maintain this condition.

When impending saturation of the core of transformer Q1 prevents secondary winding W3 from inducing enough voltage in secondary winding W2 to maintain transistor Q1 in saturation, or when the gain of transistor Q1 is no longer sufficient to maintain the current, a resulting slight reduction in current through transistor Q1 begins an avalanche reaction in which the magnetic field in transformer T1 begins to collapse. This rapidly switches transistor Q1 into the cut-off condition and returns the core of transformer T1 to the original saturated condition which is maintained by the current through primary winding W1. As explained in my prior referenced patent application, the period of the output pulse from switch 106 is controlled by the relationship between the number of turns on windings W2 and W3. In the preferred embodiment this turns relationship is adjusted to provide an output pulse of about 100 microseconds.

Figure 12:
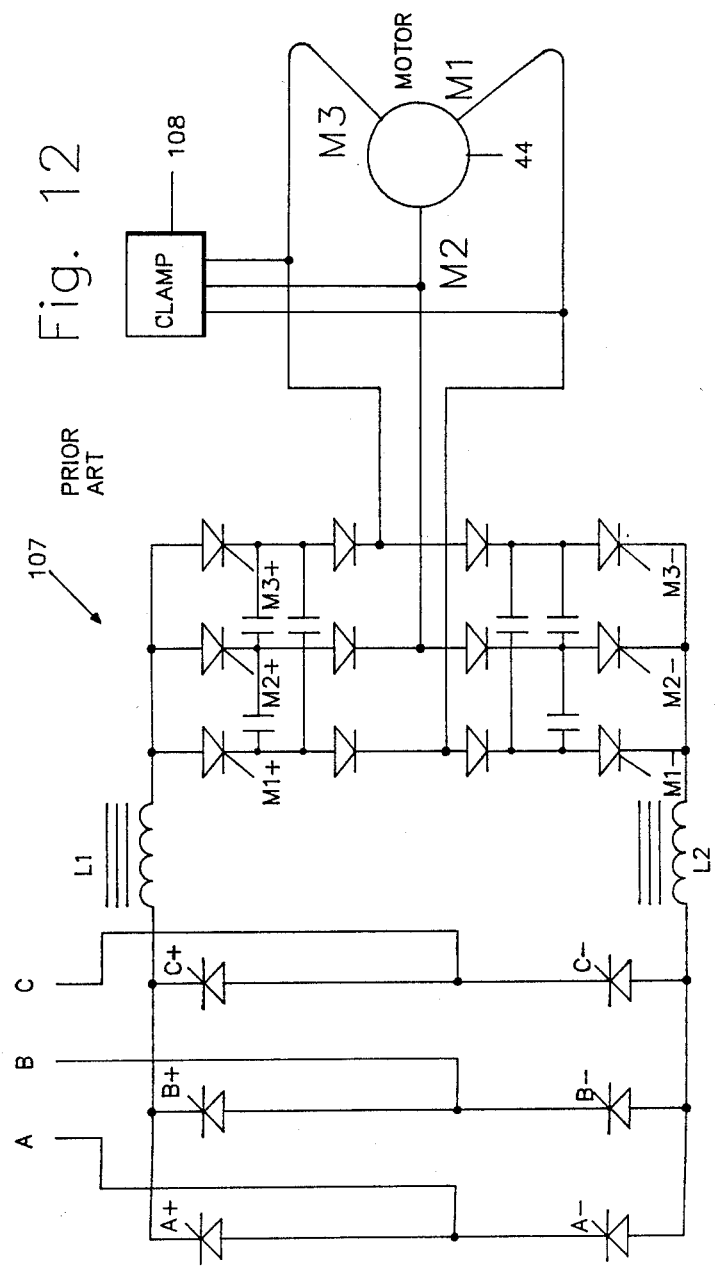
FIG. 12 is a schematic diagram of a power drive circuit of a current source inverter control system according to the prior art.

Referring now to FIG. 12, there is shown a conventional current source inverter circuit 107 for driving induction motor 44. Six silicon-controlled rectifiers, forming a full-wave bridge rectifier, receive the fire signals for the plus and minus phases A, B and C at their control gates. The resulting plus and minus DC voltages are applied through smoothing inductors L1 and L2 to a motor gating circuit consisting of six silicon-controlled rectifiers and six diodes. Motor-control signals, generated in the manner previously described, control the conduction of the six silicon-controlled rectifiers to provide a sequence of power signals to induction motor 44 which is effective to drive induction motor 44 at the commanded speed. The motor driving signals are sequenced to the motor windings in the same manner as described in connection with FIG. 8 except that, instead of applying a sequence of partial AC waveforms during a period, the apparatus of FIG. 12 gates single DC power positive and negative pulses to the selected motor windings during the entire durations of the illustrated periods. Smoothing inductors L1 and L2 are sized to provide substantially constant current to induction motor 44. This improves the waveform fed to induction motor 44. In addition, smoothing inductors L1 and L2 function as a ballast to limit current to the motor-control silicon-controlled rectifiers in case of a misfire in the silicon-controlled rectifiers which places a short circuit across the DC power lines.

When power to a winding of induction motor 44 is cut off at the end of a period, the collapsing magnetic field in the winding produces a reverse voltage which is fed through the diodes and is stored in the capacitors connected between the motor sides of the silicon-controlled rectifiers. When a silicon-controlled rectifier is turned on at the beginning of the next period, the voltages stored in the six capacitors apply reverse voltages to the previously conducting silicon-controlled rectifiers to ensure extinguishment of the current therethrough. If nothing is done to prevent its a destructive voltage builds up in the six capacitors. In order to limit the voltage stored in the six capacitors, a clamp circuit 108 is connected across the windings of induction motor 44. Clamp circuit 108 which may be, for example, a high-power Zener diode, a non-linear resistor, a transistor circuit or other suitable device, limits any excess voltage which would otherwise build up in the capacitors.

The prior-art device of FIG. 12 has a number of drawbacks which have prevented its wide adoption. Specifically, the control system requires a motor having a low Q. That is, it requires a motor which has a relatively low ratio of inductance to resistance. It is preferable to have a control system which can be adapted for use with any type of motor, especially high-efficiency motors which are unsuitable for use with the illustrated prior-art apparatus. In addition, the six diodes and six capacitors add significantly to the cost and size of the apparatus. Finally, clamp circuit 108 dissipates a significant amount of power, leading to a reduction in efficiency of the motor and its control system.

Figure 13:
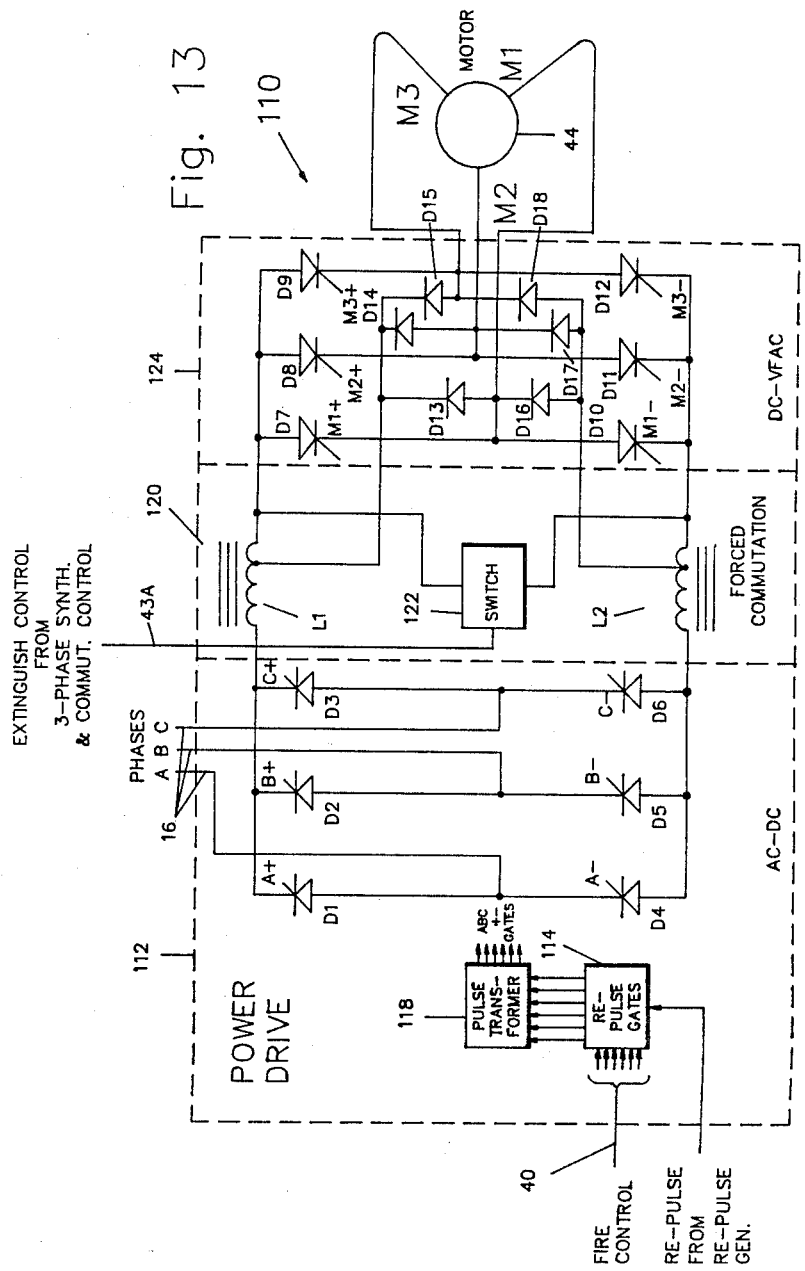
FIG. 13 is a schematic diagram of a power drive circuit of a current source inverter control system according to an embodiment of the invention.

Referring now to FIG. 13, a current source inverter version of a power drive circuit is shown, generally at 110, according to an embodiment of the invention. An AC-DC section 112 includes a 3-phase bridge rectifier consisting of silicon-controlled rectifiers D1–D6 receiving AC power phases A, B and C at appropriate anode and cathode terminals and fire control signals at their gates. The fire control signals, generated by power control circuit 18 (FIG. 5) are applied on line 40 to re-pulse gates 114. The high-frequency train of narrow re-pulse signals from re-pulse generator 45 (FIG. 1) is applied to re-pulse gates 114 where it gates or chops any existing fire control signal on and off at the frequency of the re-pulse signal. The frequency of the re-pulse signal may be, for example, about 16 KHz. The gated, or chopped, fire control signals are applied to pulse transformers 118 which, in turn, connect the fire control signals to the appropriate gates of silicon-controlled rectifiers D1–D6. Since the re-pulse gating of the fire control signals converts these signals into high-frequency pulse trains, small and low-cost pulse transformers can be used in pulse transformers 118. In addition, if one or more of silicon-controlled rectifiers D1–D6 should fail to fire when first enabled by a fire control signal, the repetitive triggering by the high-frequency pulse train created by gating the fire control signals with the re-pulse signal ensures that it, or they, are triggered into action without significant delay. Once a silicon-controlled rectifier is triggered into conduction, any further signals appearing at its gate are ignored. Thus, although a continuous stream of fire control signals is applied to the gates of enabled silicon-controlled rectifiers, only the first one to produce conduction within the silicon-controlled rectifier is effective—the remainder have no effect.

The pulsating DC power produced by AC-DC section 112 is smoothed in inductors L1 and L2 in a forced commutation section 120. In addition to smoothing the AC ripple produced by AC-DC section 112, inductors L1 and L2 also provide a ballast for limiting the current in the event of a misfire in silicon-controlled rectifiers D7–D12 which would place a short circuit across the DC power line. A switch 122, which is preferably of the type shown in FIG. 11, is connected to the downstream ends of inductors L1 and L2. The extinguish control signal on line 43A from three-phase synthesizer and commutation control circuit 34 (FIG. 7) is applied to switch 122. The DC power from inductors L1 and L2 is applied to the illustrated anode and cathode terminals of silicon-controlled rectifiers D7–D12 in a DC power to variable-frequency AC section 124. Pairs of diodes, D13–D18 are connected between windings M1, M2 and M3 and taps near the downstream ends of inductors L1 and L2. The commutation commands from three-phase synthesizer and commutation control circuit 34 (FIG. 7) are applied to the gates of silicon-controlled rectifiers D7–D12 for applying the plus and minus DC power to windings M1, M2 and M3 of induction motor 44 in the sequence previously described.

At the time of transition between periods, as defined in connection with FIG. 8, the extinguish control signal enables switch 122 to place a short circuit between the downstream ends of inductors L1 and L2 for a short time such as, for example, 100 microseconds. During this time, the short circuit across the source of DC power should extinguish current in all previously conducting silicon-controlled rectifiers in DC power to variable-frequency AC section 124. It should be noted that the shorting action of switch 122 eliminates the need for the six additional diodes and capacitors, and the clamp circuit present in the prior art device in FIG. 12. When the downstream ends of inductors L1 and L2 are short circuited, voltages are generated at the taps thereof having amplitudes and polarities which, when applied to diodes D13–D18, are effective to back bias, and cut off, any ones of silicon-controlled rectifiers D7–D12 which were previously conducting. This ensures positive cutoff of silicon-controlled rectifiers D7–D12 as required at the time of transition. Due to the extremely brief duration of the short circuit, the circuit remains efficient. Besides this desirable reduction in equipment complexity and increased efficiency, the present invention eliminates the need for induction motor 44 to be a low-Q device.

The circuit of FIG. 13, requires that inductors L1 and L2 be capable of handling the lower frequencies of the ripple from the full-wave bridge rectifier as well as the high frequencies of the 100-microsecond shorting pulses produced by switch 122. Such a compromise may lead to characteristics in inductors L1 and L2 which are not ideal.

Figure 14:
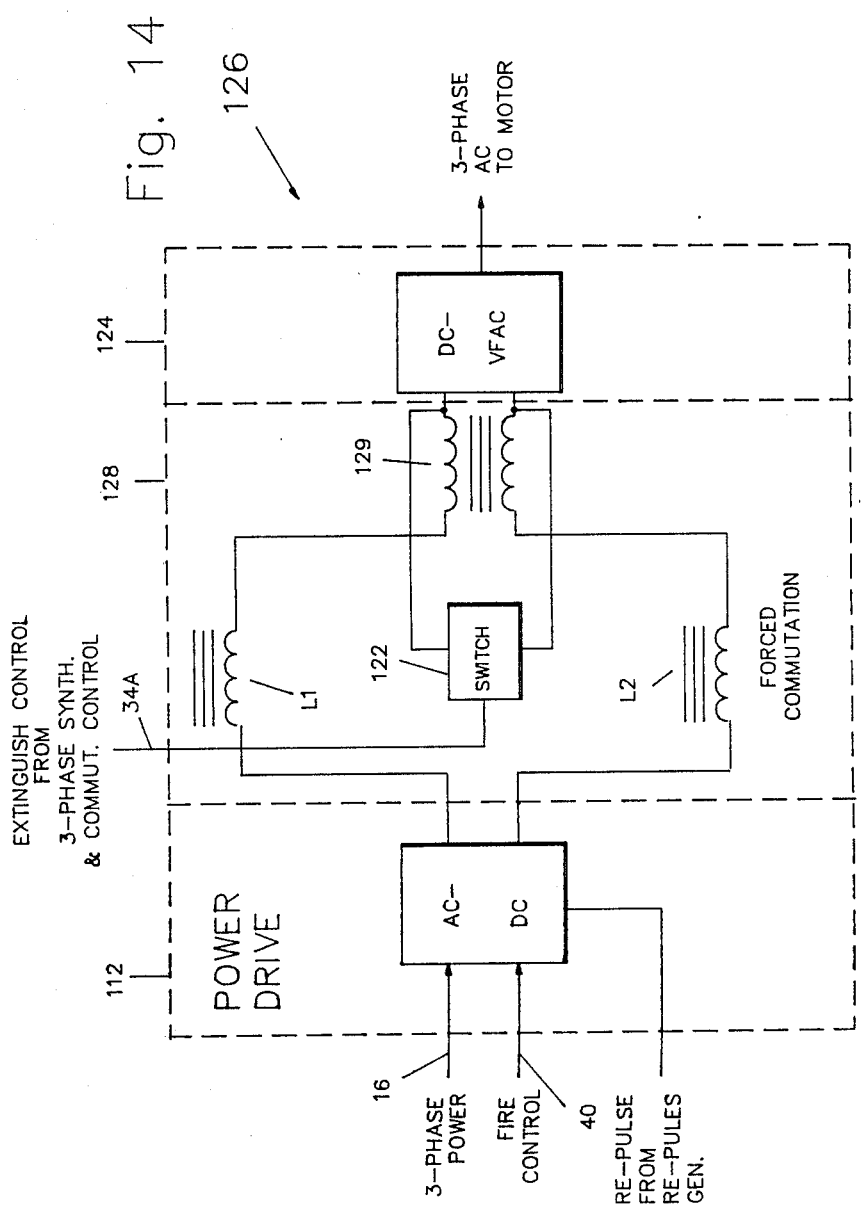
FIG. 14 is a schematic diagram of a power drive circuit of a current source inverter control system according to a further embodiment of the invention.

Referring now to FIG. 14, a further improved power drive circuit 126 includes AC-DC section 112 and DC power to variable-frequency AC section 124 corresponding to those in FIG. 13. A forced commutation section 128 includes smoothing inductors L1 and L2 and switch 122, but further includes a bi-wound inductor 129 downstream of inductors L1 and L2 having two windings on a common core. Switch 122 is connected across the downstream ends of the windings of bi-wound inductor 129. The high-frequency switching requirements imposed when switch 122 is triggered are accommodated by bi-wound inductor 129 whereas the lower-frequency smoothing requirements are accommodated by inductors L1 and L2. In this circuit, bi-wound inductor 129 is only required to support an output pulse for the relatively short pulse time of switch 122. Thus, bi-wound inductor 129, and especially the core thereof, can be made of materials suitable for high frequencies without compromising the low-frequency characteristics of inductors L1 and L2. The windings of inductors L1 and L2 may optionally be wound on a common core. In systems controlling a low-power induction motor 44, the waveform degradation which results from elimination of inductors L1 and L2 may be permissible. In order to permit elimination of inductors L1 and L2, however, commutation must be made positive enough that cross-fire through silicon-controlled rectifiers across the DC power line is virtually impossible.

The embodiments of the invention shown in FIGS. 13 and 14 should effectively extinguish all current through the silicon-controlled rectifiers therein by placing a momentary short circuit across the DC power lines feeding DC power to variable-frequency AC section 124. It is possible, however, that reactive flyback produced by the windings of induction motor 44 may be sufficient to maintain a residual current through the previously conducting silicon-controlled rectifiers beyond the period of the short circuit. This may permit a cross-fire across the DC power line.

Figure 15:
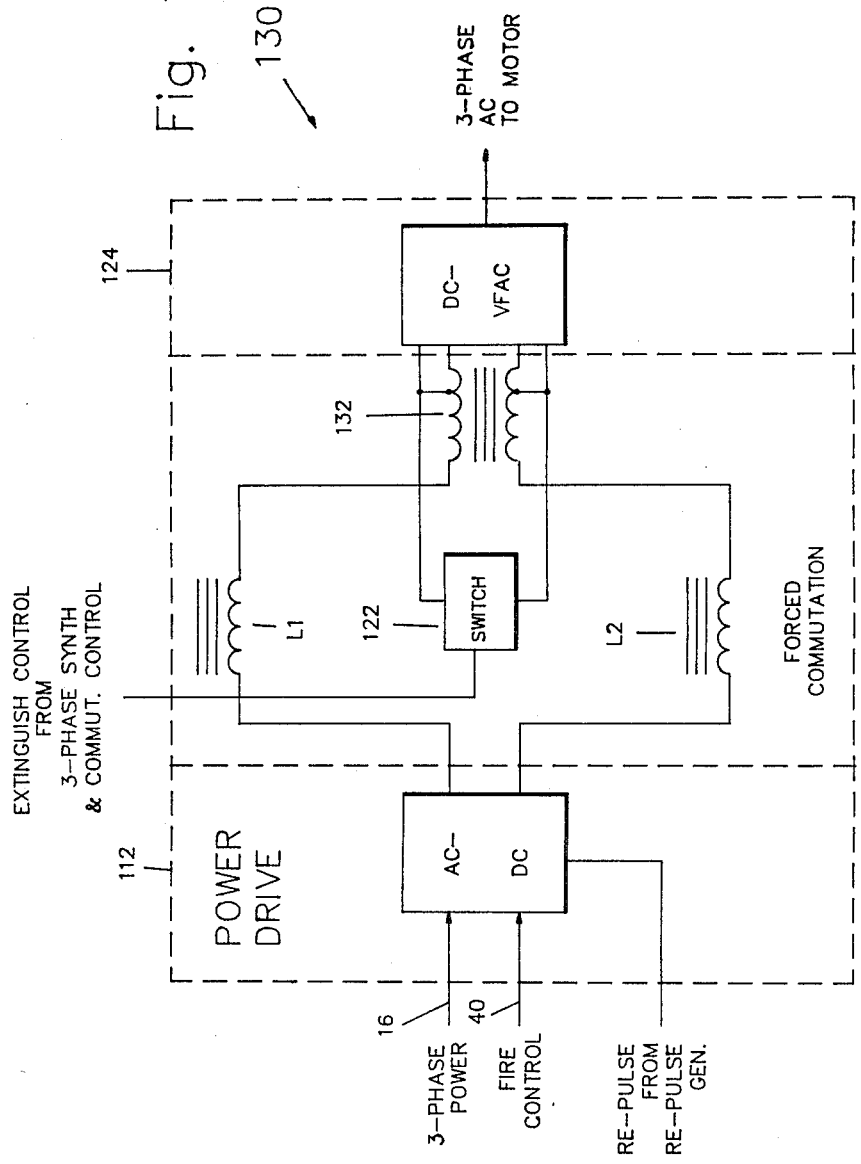
FIG. 15 is a schematic diagram of a power drive circuit of a current source inverter control system according to a still further embodiment of the invention.

Referring now to FIG. 15, a further improved power drive circuit 130 provides more positive extinguishment of current in the silicon-controlled rectifiers. A bi-wound inductor 132 on a common core includes taps near the downstream end of each of its windings for connection to switch 122. When switch 122 places a short circuit between the taps on the windings of bi-wound inductor 132, the downstream ends of the windings of bi-wound inductor 132 are driven into the opposite polarity from that which supports conduction in the silicon-controlled rectifiers of DC power to variable-frequency AC section 124. This back-biases the silicon-controlled rectifiers in DC power to variable-frequency AC section 124 and ensures extinguishment of both the positive and negative phases. In addition, due to the short time during which switch 122 maintains the short circuit across the taps on bi-wound inductor 132, bi-wound inductor 132 may be able to support the voltage at the downstream end of AC-DC power section 112 without the need for the weight, cost and inefficiency of inductors L1 and L2. Thus inductors L1 and L2 may be eliminated at the penalty of an increase in ripple fed to induction motor 44.

In the preferred embodiment, each winding of bi-wound inductor 132 consists of about 100 turns on a common powdered-iron core. The taps are located far enough from the downstream end of their respective windings to provide a reverse voltage sufficiently great to ensure extinguishment of current. In the preferred embodiment, the taps are located from about 3 to about 30 percent of the number of turns from the downstream end and, in the most preferred embodiment, the taps are located at, from about 5 to about 20 turns from the downstream end of 100-turn windings.

Figure 16:
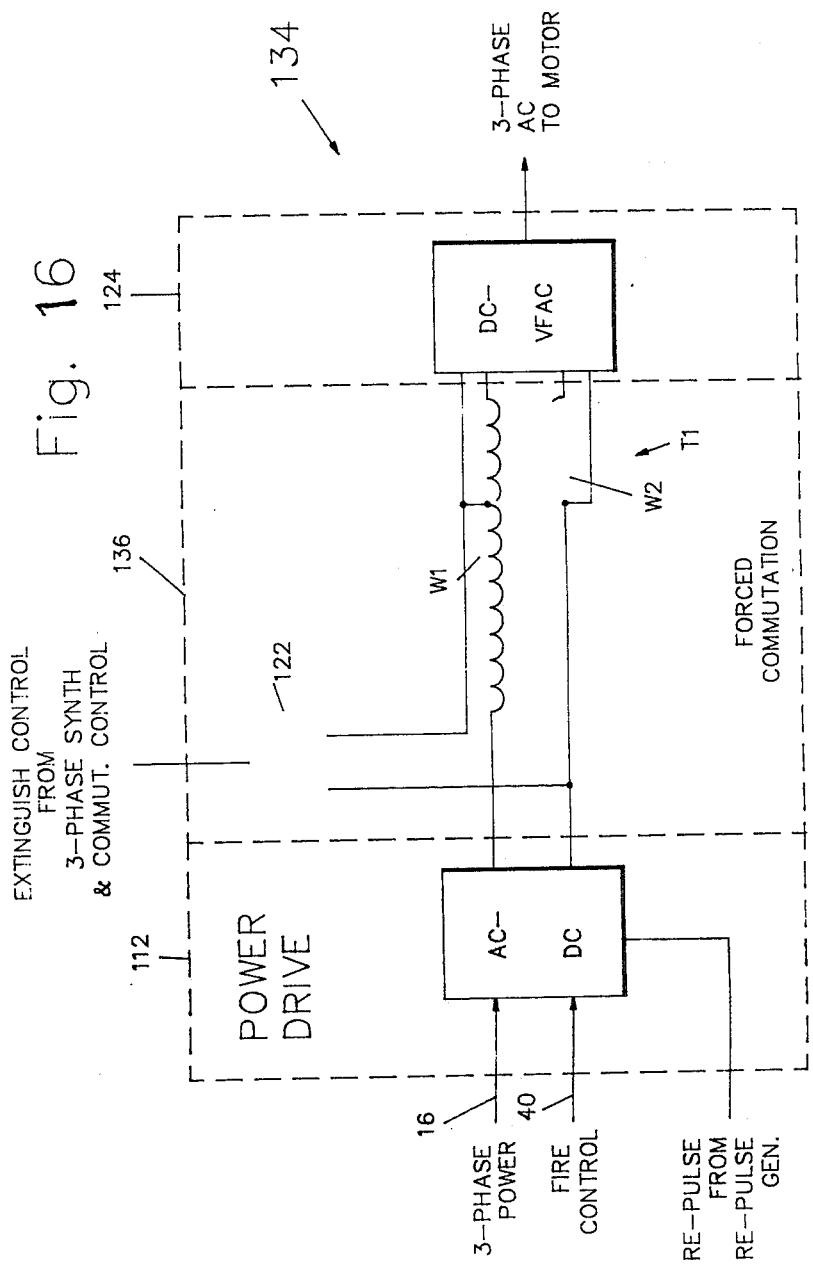
FIG. 16 is a schematic diagram of a power drive circuit of a current source inverter control system according to a still further embodiment of the invention.

Referring now to FIG. 16, a power drive circuit 134 is shown which offers the performance of the apparatus of FIG. 5 but does not require bi-wound inductor 129. A forced commutation section 136 includes a transformer T1 having a tapped winding W1 and a second winding W2 on a common core. The DC power from AC-DC section 112 is fed through tapped winding W1 and winding W2 on its way to DC to variable-frequency AC section 124. The tap on winding W1 is located a number of turns from the downstream end of W1 equal to the number of turns on winding W2. Switch 122 is connected between the tap on winding W1 and the upstream end of winding W2. The operation of the embodiment in FIG. 16 should be clear from the description of foregoing embodiments and is therefore omitted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A variable speed motor control system for controlling a speed and torque of an induction motor comprising:

a power control circuit;

a commutation control circuit;

a speed control circuit including means for producing a speed signal;

a power drive circuit;

said power control circuit including means responsive to said speed signal for applying a power control signal to said power drive circuit;

said commutation control circuit including means independently responsive to said speed signal for applying a commutation command signal to said power drive circuit;

said power drive circuit including means responsive to said power control signal for controlling an amount of power fed to said induction motor;

said power drive circuit further including means responsive to said commutation command signal for controlling a speed of a commutation sequence of power application to windings of said induction motor;

means responsive to a current in said induction motor exceeding a predetermined maximum value for limiting said power control signal and said commutation command signal fed to said power drive circuit;

said power drive circuit includes:

an AC to DC power portion for rectifying a portion of phases of an AC power to produce a substantially DC power, said portion being dependent upon said power control signal;

said means for controlling a speed including a DC to variable-frequency AC portion responsive to said commutation command signal for gating said substantially DC power to first, second and third motor windings of said induction motor in a sequence effective to drive said induction motor at a speed related to said speed signal;

an inductor between said AC to DC portion and said DC power to variable-frequency AC portion;

means for short-circuiting said substantially DC power downstream of at least a portion of said inductor each time power to one of said first, second and third windings is to be terminated and power to another of said first, second and third windings is to be begun; and said means for short-circuiting including a self-regenerating switch having a transformer with a saturable core, a primary winding of said transformer normally being effective for maintaining said core in saturation, a first secondary winding of said transformer being disposed between a base and an emitter terminal of a transistor, a third winding of said transformer being disposed in series with a collector-emitter path of said transistor, said collector-emitter path being connected in series between opposite polarities of said substantially DC power, and a relationship between a number of turns on said primary winding and said first and second secondary windings being effective to maintain said transistor saturated for a predetermined period in response to an extinguish control signal applied to said primary winding.

2. A variable speed motor control system according to claim 1 wherein said AC to DC portion and said DC power to variable-frequency AC portion include silicon-controlled rectifiers, and said motor control system further includes means for modulating at least one of said commutation control and power control signals at a re-pulse frequency which is at a high frequency with respect to a frequency of said AC power whereby, if one or more of said silicon-controlled rectifiers fails to turn on when first enabled, such silicon-controlled rectifiers are turned on without substantial delay.

3. A variable speed motor control system according to claim 2 wherein said inductor includes a bi-wound inductor having first and second inductor windings on a common core.

4. A variable speed motor control system according to claim 1 wherein said first and second inductor windings are tapped at first and second tap points at corresponding intermediate points thereon, said short circuiting being connected between said first and second tap points whereby a reverse voltage appears at a downstream end of said first and second windings when a short circuit exists, said reverse voltage being sufficient to back bias all of said silicon-controlled rectifiers whereby positive extinguishment of current therethrough is achieved.

5. A variable speed motor control system according to claim 4 wherein said AC to variable-frequency DC power portion further includes a plurality of diodes between said first, second and third motor windings and each of said opposite polarities of said substantially DC power, said plurality of diodes being poled to clamp voltages produced by reactive flyback in said first, second and third motor windings.

6. A current-source inverter for variable speed control of an induction motor comprising:
   an AC to DC power portion for rectifying a portion of phases of an AC power to produce a substantially DC power, said portion being dependent upon a power control signal;
   a DC to variable-frequency AC portion responsive to a command signal for gating said substantially DC power to first, second and third motor windings of said induction motor in a sequence effective to drive said motor at a speed related to a speed signal;
   an inductor between said AC to DC portion and said DC power to variable-frequency AC portion;
   means for short-circuiting said substantially DC power downstream of at least a portion of said inductor each time power to one of said first, second and third motor windings is to be terminated and power to another of said first, second and third motor windings is to be begun; and
   said means for short-circuiting including a self-regenerating switch having a transformer with a saturable core, a primary winding of said transformer normally being effective for maintaining said core in saturation, a first secondary winding of said transformer being disposed between a base and an emitter terminal of a transistor, a third winding of said transformer being disposed in series with a collector-emitter path of said transistor, said collector-emitter path being connected in series between opposite polarities of said substantially DC power, and a relationship between a number of turns on said primary winding and said first and second secondary windings being effective to maintain said transistor saturated for a predetermined period in response to an extinguish control signal applied to said primary winding.

7. A current-source inverter according to claim 6 wherein said AC to DC portion and said DC power to variable-frequency AC portion include silicon-controlled rectifiers, and said current-source inverter further includes means for modulating said power control signal at a re-pulse frequency which is at a high frequency with respect to a frequency of said AC power whereby, if one or more of said silicon-controlled rectifiers fails to turn on when first enabled, such silicon-controlled rectifiers are turned on without substantial delay.

8. A current-source inverter according to claim 7 wherein said inductor includes a bi-wound inductor having first and second inductor windings on a common core.

9. A current-source inverter according to claim 8 wherein said first and second inductor windings are tapped at first and second tap points at corresponding intermediate points thereon, said means for short circuiting being connected between said first and second tap points whereby a reverse voltage appears at a downstream end of said first and second inductor windings when a short circuit exists, said reverse voltage being sufficient to back bias all of said silicon-controlled rectifiers whereby positive extinguishment of current therethrough is achieved.

10. A current-source inverter according to claim 9 wherein said AC to variable-frequency DC power portion further includes a plurality of diodes between said first, second and third motor windings and each of said opposite polarities of said substantially DC power, said plurality of diodes being poled to clamp voltages produced by reactive flyback in said first, second and third motor windings.

* * * * *